US012762361B2

(12) United States Patent
Mazza

(10) Patent No.: US 12,762,361 B2
(45) Date of Patent: Oct. 13, 2026

(54) RADIO FREQUENCY IDENTIFICATION READER

(71) Applicant: FriSense Limited, London (GB)

(72) Inventor: Marco Mazza, Courtaman (CH)

(73) Assignee: FriSense Limited, London (GB)

( * ) Notice: Subject to any disclaimer, the term of this patent is extended or adjusted under 35 U.S.C. 154(b) by 0 days.

(21) Appl. No.: 18/709,203

(22) PCT Filed: Nov. 11, 2022

(86) PCT No.: PCT/EP2022/081616
§ 371 (c)(1),
(2) Date: May 10, 2024

(87) PCT Pub. No.: WO2023/084020
PCT Pub. Date: May 19, 2023

(65) Prior Publication Data
US 2025/0005306 A1 Jan. 2, 2025

(30) Foreign Application Priority Data
Nov. 11, 2021 (GB) ..................................... 2116264

(51) Int. Cl.
*G06K 7/04* (2006.01)
*G06K 7/015* (2006.01)

(52) U.S. Cl.
CPC ............... *G06K 7/04* (2013.01); *G06K 7/015* (2013.01)

(58) Field of Classification Search
CPC ...... G06K 7/04; G06K 7/015; G06K 7/10316; G06K 7/10326; G06K 7/10009;
(Continued)

(56) References Cited

U.S. PATENT DOCUMENTS 6,104,291 A 8/2000 Beauvillier et al.
9,208,362 B1 * 12/2015 Fink .................. G06K 7/10336
(Continued)

FOREIGN PATENT DOCUMENTS

WO 2020/160733 A1 8/2020
WO 2021136208 A 7/2021

OTHER PUBLICATIONS

Apr. 8, 2022—(GB) Search Report—GB2116264.9.
Feb. 3, 2023—(WO) International Search Report and Written Opinion—PCT/EP2022/081616.

*Primary Examiner* — Matthew Mikels
(74) *Attorney, Agent, or Firm* — KellDann Law PLLC; Ross Dannenberg

(57) ABSTRACT

A resonator for a radio frequency identification reader is provided. The resonator comprises: a waveguide closed at a proximal end and closed at a distal end and dimensioned to facilitate resonance in radio frequency waves having a frequency of operation so that the radio frequency waves produce an electric field in the waveguide having a peak intensity at a location between the proximal end and the distal end: a holder for holding one or more radio frequency identification tags at the location at which the electric field produced by radio frequency waves having the frequency of operation has a peak intensity; and a radio frequency feed point for coupling radio frequency signals between the waveguide and radio frequency identification reader circuitry.

16 Claims, 9 Drawing Sheets

(58) Field of Classification Search
CPC ....... G06K 19/07796; H01P 7/06; H01P 3/12; G07D 11/00
See application file for complete search history.

(56) References Cited

U.S. PATENT DOCUMENTS

| | | | | |
|---|---|---|---|---|
| 2007/0063914 | A1* | 3/2007 | Becker ...................... | H01P 5/18 343/840 |
| 2014/0291397 | A1 | 10/2014 | Caputo et al. | |
| 2015/0054626 | A1 | 2/2015 | Ashida et al. | |
| 2018/0114041 | A1 | 4/2018 | Bai et al. | |
| 2018/0331412 | A1 | 11/2018 | Chennupati | |
| 2019/0272396 | A1 | 9/2019 | Clouser et al. | |
| 2021/0133403 | A1* | 5/2021 | Martín Antolín .... | G06K 19/067 |

* cited by examiner

RADIO FREQUENCY IDENTIFICATION READER

FIELD OF THE INVENTION

This application relates to a capacitive coupled tag (CC-tag or CCT) reader. More specifically, this application relates to a coupler that serves as an interface between reader circuitry and one or more capacitive coupled tags.

BACKGROUND

CC-tags provide increased security whilst providing authenticity and tracking functionality. CC-tags have particular advantages as they can be made smaller and so can have wider use with a larger range of artefacts or items to be tagged.

CC-tags may be read using a tag reader having plates either side of the CC-tag (and item attached to the CC-tag). The reader then detects changes in electrical impedance caused by the tag implementing a signal modulation. Such CC-tags have top and bottom electrodes to interact with the parallel metal plates of the reader.

MEMORIES/26.6, 1-4244-0852-0/07, 2007 IEEE, pages 482 to 483 describes an RFID chip that has a unique IP address and that uses double-surface electrodes. A further requirement is that RFID tags can be read in the presence of other RFID tags. This can be particularly difficult for very small RFID tags that may be embedded in many separate items stacked or placed close together.

WO 2020/148550 describes that when more than one or a stack of CC-tags are placed within an electric field generated by a reader, the CC-tags may be configured so that only one of the CC-tags responds. The remaining CC-tags may reduce their impedance (e.g. statically) by applying a short circuit between the metal surface and the opposite semiconductor surface, so that each of the CC-tags in turn and in isolation can respond and provide an output signal by modulating the RF input signal.

However, the electromagnetic signals from the reader circuitry that are received at the tag may be diminished by shielding effects due to the object in which the tag is embedded (or to which the tag is affixed). This can be especially problematic when there are a plurality of objects and associated tags arranged in a stack, so that each tag must be read in the presence of the other tags and objects in the stack. Therefore, there is a need to improve transmission of electromagnetic signals between the tag (or tags) and the reader circuitry.

SUMMARY

To address the problems described above, a coupler is provided to serve as an interface between reader circuitry and a CC-tag. The coupler may be capable of serving as an interface between a CC-tag reader and a plurality of CC-tags in a stack. The coupler may act as a resonator to amplify the electric field from the reader at the location of the one or more tags.

A resonator for a radio frequency identification reader is provided. The resonator comprises a waveguide closed at a proximal end and closed at a distal end and dimensioned to facilitate resonance in radio frequency waves having a frequency of operation so that the radio frequency waves produce an electric field in the waveguide having a peak intensity at a location between the proximal end and the distal end. The resonator further comprises a holder for holding one or more radio frequency identification tags at the location at which the electric field produced by radio frequency waves having the frequency of operation has a peak intensity. The resonator further comprises a radio frequency feed point for coupling radio frequency signals between the waveguide and radio frequency identification reader circuitry.

Advantageously, by providing a resonator that focuses the RF waves at the location of the tags, the coupling of RF signals between RF tags placed in the holder and reader circuitry electrically coupled to the RF feed point may be improved. This may allow more objects to be placed in the reader simultaneously and successfully read. This may also reduce errors produced when reading RF tags (for example, the resonator may reduce errors reading tags that are affixed to objects that might otherwise cause the tags to be shielded from the RF reader).

Moreover, the resonator may provide a shielded enclosure in which the tags are read.

The dimensions of the resonator may be designed so that resonance occurs at the desired frequency of operation.

In some cases, the suitable range of frequencies of operation may be from 860 MHz to 960 MHz. The resonator may be dimensioned to resonate at a frequency of operation in the suitable range of frequencies of operation.

In one example, the resonator may be dimensioned to resonate at a frequency of 910 MHz. By designing the dimensions of the resonator so that the frequency of operation is well within the suitable range of frequencies of operation, the actual frequency of operation may be adjusted up or down slightly while still remaining within the suitable range. The frequency of operation may be adjusted to account for variations caused by properties of the tags in the reader and/or tuning performed to manually adjust the impedance of the resonator, for example.

When the stacked tags are placed in the holder, and a suitable signal is applied from RF reader circuitry at the frequency of operation, the strength of the electric field at the stacked tags is the highest and the currents are zero. The resonator may therefore provide a low loss match of the relatively low impedance of the reader circuitry to the high impedance of the stacked tags, without the need for any lumped elements.

The radio frequency identification (RFID) reader may be a CC-tag reader. The RFID tags may be capacitive coupled tags. The RFID reader circuitry may be CC-tag reader circuitry.

The holder may be inside the waveguide.

The waveguide may be a rectangular waveguide.

The waveguide may be a ridged waveguide comprising a pair of ridges extending from the proximal end of the waveguide towards the distal end of the waveguide.

Advantageously, a double ridged waveguide may be dimensioned at the desired frequency of operation so that the stacked tags fit between the ridges. Moreover, the resulting field may be confined in the centre of the resonator.

The location at which the electric field produced by radio frequency waves having the frequency of operation may have a peak intensity between the pair of ridges.

The holder may be between the two ridges of the waveguide.

The resonator may comprise an insulating gap between each ridge of the pair of ridges and the distal end of the waveguide.

By providing a gap between the pair of ridges and the distal end of the waveguide, a short-circuited section of rectangular waveguide operated in cut-off region is provided. This may reduce the overall length of the resonator and therefor make the resonator more practical to handle.

Furthermore, providing a section of rectangular waveguide may reduce surface currents at the plane between the two portions of the waveguide and therefore reduce resistive losses at the interface between the portions.

Each insulating gap may be an air gap.

Each insulating gap may be provided by a dielectric material.

The holder may comprise a resilient member configured to apply a force to the one or more radio frequency identification tags to urge the one or more radio frequency identification tags together.

The resilient member may comprise a biased conductive tip.

The resilient member may be a spring-loaded pin protruding from one of the ridges.

The waveguide may comprise a tuner to adjust the impedance of the resonator (as seen from the feed point or from the reader circuitry). This may be used to match the resonator to the reader circuitry.

The tuner may be arranged to adjust the real part of the impedance. The tuner may be used to adjust the real part of the impedance to 50 ohms.

The tuner may comprise an adjustable conductive connection between the proximal end of the resonator and a first ridge of the pair of ridges.

A central longitudinal axis of the waveguide may be defined that extends from the proximal end of the waveguide to the distal end of the waveguide and is centrally located within the waveguide. The adjustable conductive connection may comprise a sliding contact. The conductive connection may be adjustable by moving the sliding contact between a first location adjacent to a surface of the first ridge that faces a corresponding surface of a second ridge of the pair of ridges and a second position that is further from the second ridge.

The tuner may comprise a motor configured to move the sliding contact.

The tuner may comprise one or more pin diodes and/or varactors.

The waveguide may be formed from two portions that are mechanically coupled together so that the portions are in conductive communication at an interface between the two portions. The portions may be decoupleable to provide access to the holder, which may be inside the waveguide.

Providing the waveguide in two portions may allow the stacked tags to be easily inserted and removed.

The two portions may be mechanically coupled together by one or more latches and may be decouplable by unfastening the one or more latches.

The latch may facilitate firm closing of the resonator. The latch may be a toggle latch.

The two portions of the waveguide may be mechanically coupled by a hinge. A hinge may assist with aligning the two portions of the waveguide and holding the portions together.

The hinge may be located at the proximal end of the waveguide. At least one of the one or more latches may be located at the distal end of the waveguide.

The two portions of the waveguide may comprise complementary alignment elements to position the two portions relative to each other.

The complementary alignment elements may align the two pieces when the resonator is closed. The complementary alignment elements may comprise a nose in one portion of the waveguide and a notch in the other portion of the waveguide.

Spring fingers may be provided to ensure good electrical contact at the plane that splits the resonator into two pieces.

A radio frequency identification reader is also provided. The reader comprises a resonator as described above. The reader further comprises radio frequency identification reader circuitry electrically coupled to the radio frequency feed point of the resonator.

A method of reading data from one or more radio frequency identification tags is also provided. The method comprises locating the one or more radio frequency identification tags in the holder of a resonator as described above. The method further comprises reading the data from the one or more radio frequency identification tags using radio frequency identification reader circuitry electrically coupled to the radio frequency feed point of the resonator.

The one or more radio frequency identification tags may comprise one or more banknotes.

BRIEF DESCRIPTION OF THE FIGURES

The present invention may be put into practice in a number of ways and embodiments will now be described by way of example only and with reference to the accompanying drawings.

DETAILED DESCRIPTION

System Overview

The present invention may be understood with reference to a specific example of an RFID reader system. The system consists of the following subsystems, which are described in more detail below:

Reader Circuitry
Stacked tags
Coupler

Reader Circuitry

The reader circuitry comprises passive and active electronics that generate transmit waveforms and de-modulate the received RF waveforms. Typically, the reader circuitry is connected to a host system (computer). The reader may includes hardware and software (firmware).

Figure 1:
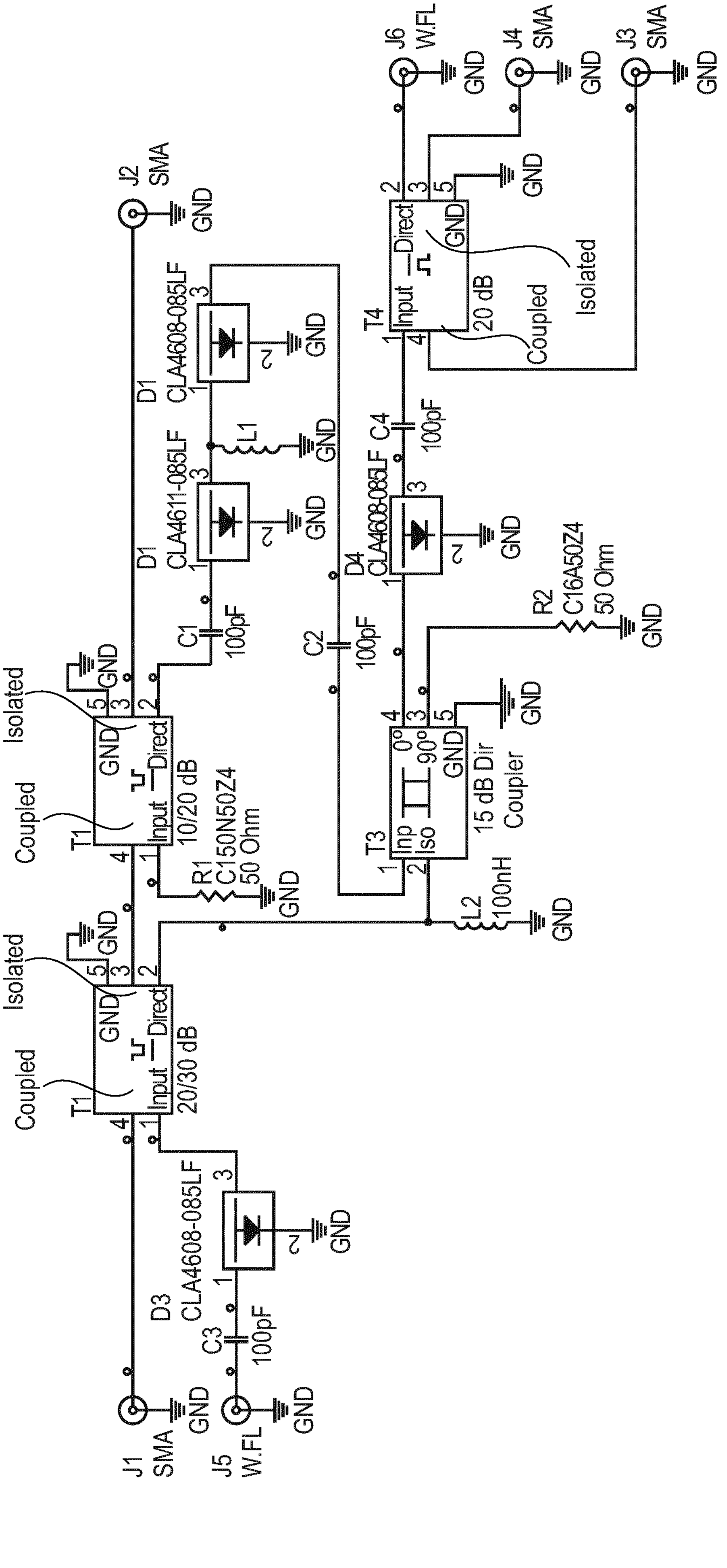
FIG. 1 illustrates a schematic of adapted passive reader front end circuitry.

Reader circuitry for use with the coupler described in this application may be based on the ST25RU3993 evaluation board by ST Microelectronics. In order to increase the power handling capability, without sacrificing its sensitivity, the passive front end may be adapted. FIG. 1 illustrates a schematic of adapted passive reader front end circuitry.

The circuit may include an extra power amplifier to achieve around 100 W. A more selective filter may also be used to improve carrier suppression.

Whilst the electronic circuit illustrated in FIG. 1 has not been described in detail, it may include UHF RFID integrated circuits and other components familiar to the skilled person and operate at a suitable frequency (e.g. 868 MHZ). The printed circuit board forming the electronic circuit may have several layers that may be used for RF isolation, for example. Other filtering, power management and communication protocols may be used. For example, the electronic circuit may also include Bluetooth or WiFi connectivity for communicating with other devices or peripherals. This electronic circuit may also incorporate mobile device control using apps and other software.

Firmware may be stored and potentially upgraded within the CC-tag reader. For example, this firmware may control the on/off powering of the device, checking Bluetooth packet control and electronic product code (EPC) or other RFID standards. The firmware may also control writing EPC and reading EPC data to a CC-tag 10 (or other data types). Success and failure modes may be managed by monitoring and limiting multiple attempts. LED indicators may also be present on the device and controlled using the firmware.

The CC-tag reader may write data to CC-tags 10 and/or read data from them. The CC-tag reader may report that no tag is present, a tag is recognised, a tag has been recognised and action taken, a tag has expired or a tag is stolen, for example. Such reports may be provided to an external device such as a mobile device running a suitable mobile application over Bluetooth or WiFi, for example.

The electronic circuit may include a processor or processors such as a Central Processing unit (CPU), and/or a single or a collection of Graphics Processing Units (GPUs). The processor may execute logic in the form of a software program or firmware. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

Stacked Tags

The tags are the devices whose information is to be read/written. For this specific system the tags are stacked vertically. They are capacitively coupled within each other as well as with the coupler.

Coupler

The coupler couples the tags in the stack of tags to the reader circuitry. The coupler performs a function similar to the antenna in a radio communication or the coil in an inductively coupled RFID system.

The electric field produced in the coupler should be aligned relative to the tags. In order to read the capacitive coupled stack of tags, a strong electric field should be generated that is perpendicular to the tag electrodes located at their surfaces.

The coupler should be well matched to the reader circuitry. The tags are powered from the RF signal supplied by the reader circuitry. If the tags and reader circuitry are only weakly coupled, the signal generated by the reader must be relatively strong. The tags can only store energy briefly. Therefore, the strong signal must be supplied while the tags are responding. Further, the tags transmit information to the reader by backscattering. In other words, they modulate their impedance and thus cause a varying reflection of the RF signal supplied by the reader. As a result, the backscattered signal arrives at the reader with relatively low amplitude but simultaneously and in the same frequency band as the strong signal produced by the reader circuitry. Therefore, the coupler must have a good match with the reader circuitry. Otherwise the signal reflected by the coupler will mask the backscattered signal and will thus impair the sensitivity of the reader circuitry.

The coupler should exhibit low losses. Typically, the stack of tags has a fairly high impedance. Losses will not only increase the power that the reader must deliver but also decrease its sensitivity. As the required RF power levels are in the range of watts, losses can also cause significant thermal challenges. Generally, matching with lumped elements will cause significant losses and is therefore not desirable.

The coupler should be well shielded. Radiated energy will complicate compliance with radio regulations, cause additional losses and might also negatively affect privacy.

The proposed approach is to read the stacked tags inside a (hollow) rectangular waveguide resonator. In its simplest form the resonator is a rectangular metallic box fully enclosing the stacked tags. It provides a fully shielded enclosure to read the tags. The dimensions can be chosen such that a resonance occurs at the desired frequency of operation. When in resonance there is a point somewhere in the resonator where the impedance matches that of the reader circuitry (which may be 50Ω). The stacked tags are placed in the middle of the resonator. At this point, the strength of the electric field is the highest and the currents are zero. The resonator thus provides a low loss match of the relatively low impedance of the reader circuitry to the high impedance of the stacked tags, without the need for any lumped elements.

A few additions are also made to the core concept. In many cases, these additional design features are made for practical reasons.

The resonator may be manufactured from two pieces. The resonator is split into two pieces such that the stacked tags can be easily inserted. The two pieces are held together by hinges at the rear of the resonator. A toggle latch allows to firmly close the resonator. A nose aligns the two pieces when the resonator is closed. Spring fingers ensure good electrical contact at the plane that splits the resonator into two pieces.

As an alternative to splitting the resonator into two pieces, a slot can be integrated into the wall of the resonator. The dimensions of the slots are chosen such that the resulting waveguide is operated in cut-off regime at the desired frequency of operation. With a carefully chosen wall thickness, the resonator still loses no RF radiation but tags can be easily inserted through the slot.

Instead of a rectangular waveguide, a double ridged waveguide is used. The advantage of the double ridged waveguide over the rectangular one is that the resulting dimensions are better adapted to that of the stacked tags. Further, the resulting field is confined in the center of the resonator.

The ridge is short circuited near the hinge. On the other side of the resonator the ridge ends in a short short-circuited section of rectangular waveguide operated in cut-off region. This may reduce the overall length of the resonator for a given frequency of operation. This may therefore make the resonator more practical to handle. Further, it reduces the resulting surface currents at the cut plane. This can help to reduce losses.

An electrically conducting spring-loaded reading tip is added at the point where the tags are located. The tip pushes against the stack and compresses it. This may help to reduce potential air gaps between the tags. Furthermore this may increase the electrical field in the region of the tags.

The resonator is matched to the reader when the impedance (measured at the resonators feed point at the frequency of operation) is purely real and has a value of 50Ω. The real part of the impedance depends primarily on the point along the resonator where the resonator is fed. The number of tags inside the resonator and variations of their properties will influence the optimum position. Because it is mechanically challenging to make this point adjustable, it is fixed. Instead, a tuning mechanism is provided.

The tuning mechanism may be used to adjust the impedance of the resonator.

In one example, the tuning mechanism is provided by an adjustable short at one end of the resonator. The position of the adjustable short may be changed by manually sliding a contact. In other examples, a motorized adjustable short may be provided.

Further examples may facilitate electronic (rather than mechanical) adjustment of the impedance (e.g. using pin diodes, varactors, and the like).

Pins diodes can be used as switches. For example, different lengths of waveguide could be switched to the resonator. This could alter the frequency of resonance, without changing the resonator mechanically.

Varactor diodes are electrically controllable capacitors that can be used to reactively load the resonator. This can be used to lower the frequency of resonance. The effect is somewhat similar to what happens when mass is added to a tuning fork.

The tuner may be used to adjust the real part of the impedance to 50 Ohms.

Resonance occurs because the RF wave is reflected at both (shorted) ends of the resonator. For this reason, the resonant frequency is changed slightly when the position of the sliding short is adjusted. To compensate, the frequency of operation may be adjusted to match the resonant frequency of the waveguide, so that the reactance is zero. In this way, the imaginary part of the impedance (reactance) does not need to be tuned. Instead, the operating frequency is set to the frequency of resonance, where the reactance is zero by definition. The frequency of operation is adjusted to match the frequency of resonance, rather than tuning the resonator to a (fixed) frequency of operation. The reason for this is that adjusting the frequency of operation is more simple to accomplish. Of course, the frequency of operation may only be adjusted within certain limits. In some cases, 860-960 MHz is the suitable range of frequencies of operation, for the current tags and reader circuitry.

The change of operation frequency may alter the position of the peak in the electric field (slightly). However, this change in position should be small and should not significantly affect performance.

An example coupler is illustrated in FIGS. 2 to 7.

Figure 2A:
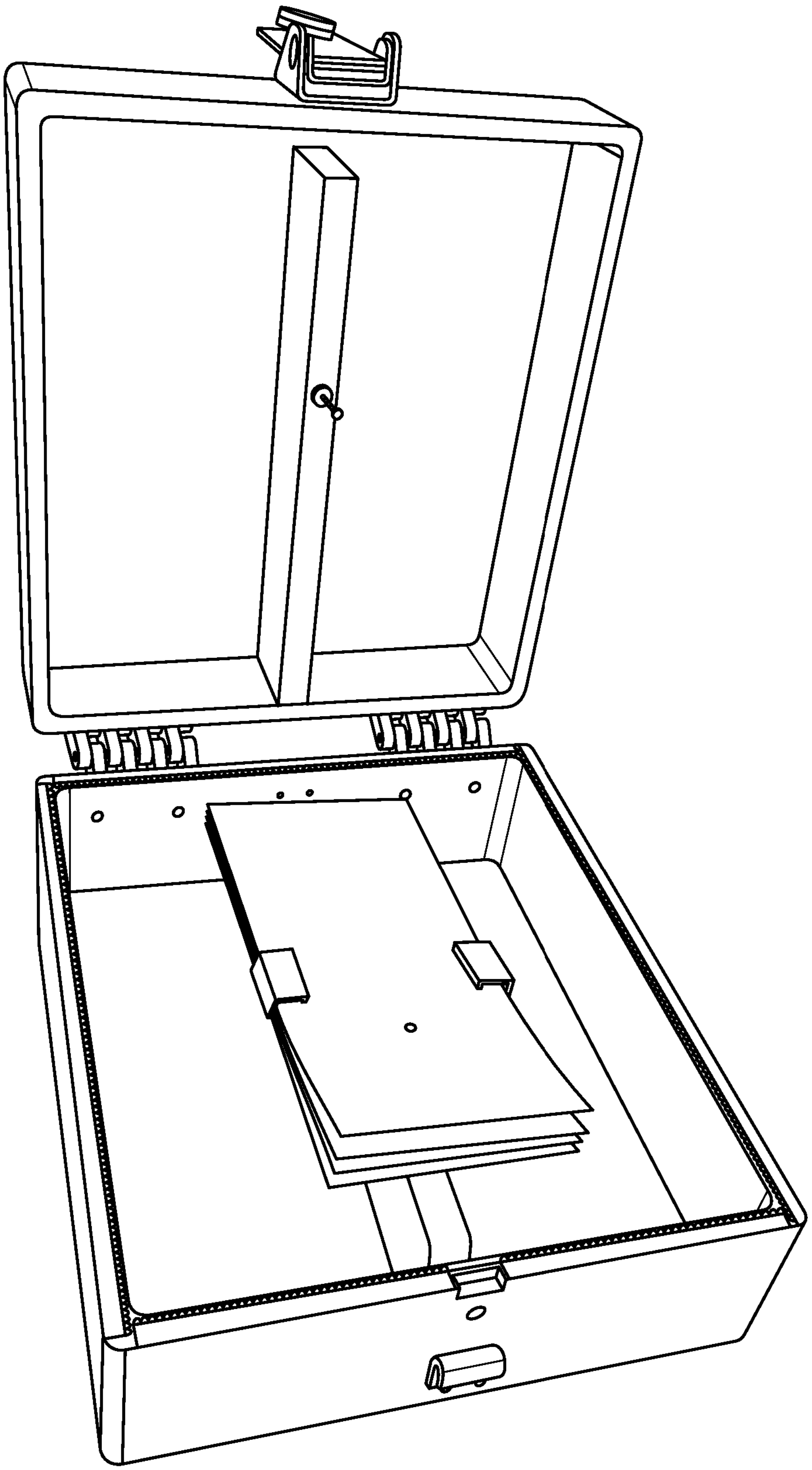
FIG. 2*a* illustrates an open coupler with stacked tags in the holder.
Figure 2B:
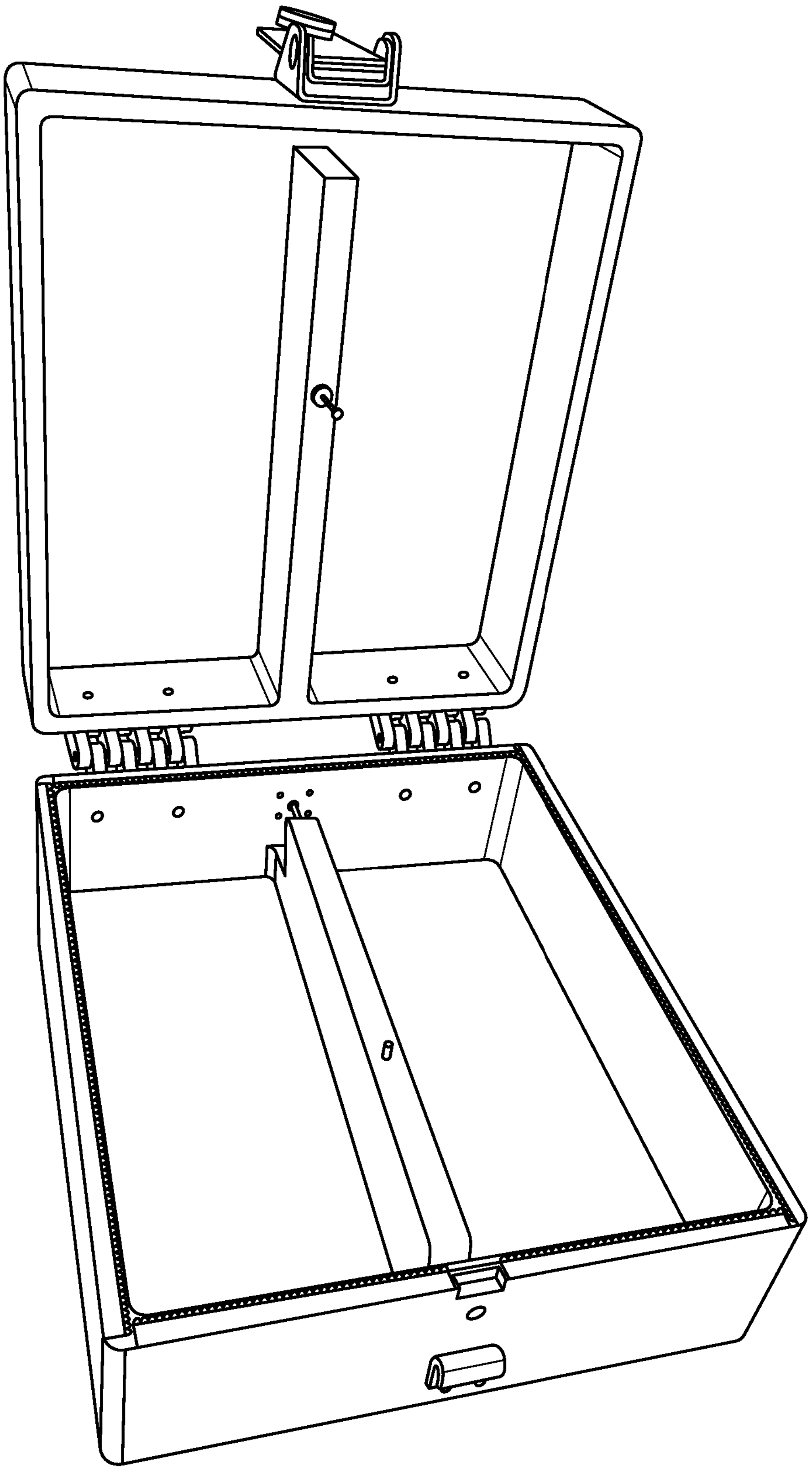
FIG. 2*b* illustrates an open coupler without stacked tags.

FIG. 2*a* illustrates an open coupler with stacked tags in the holder. FIG. 2*b* illustrates an open coupler without stacked tags.

Figure 3:
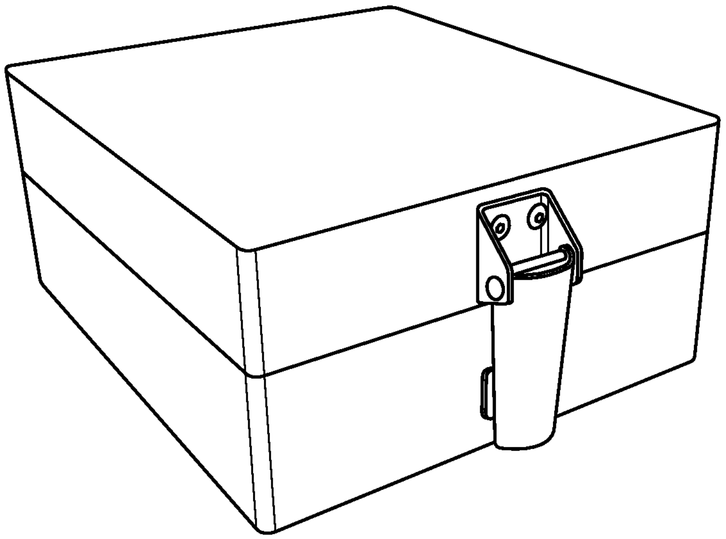
FIG. 3 illustrates a front view of a closed coupler.

FIG. 3 illustrates a front view of a closed coupler.

Figure 4:
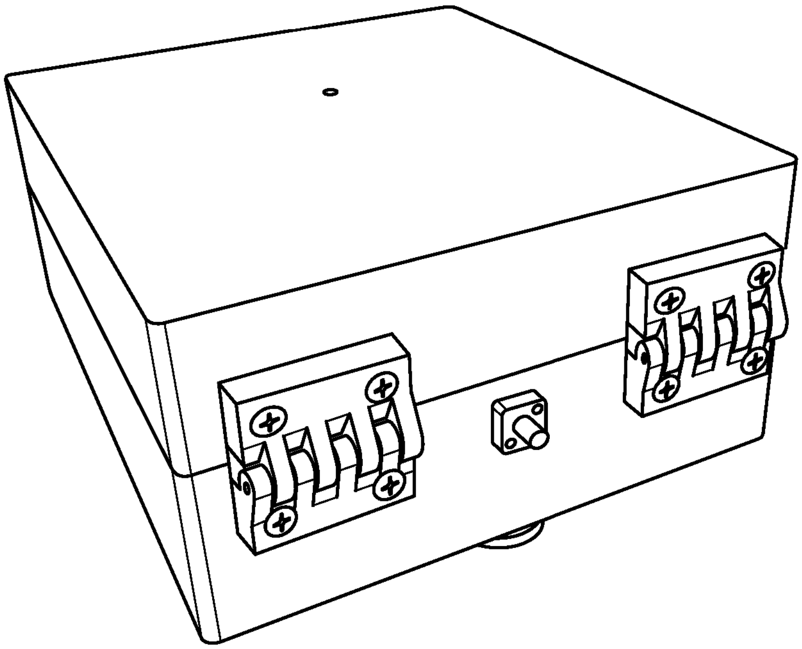
FIG. 4 illustrates a rear view of a closed coupler.

FIG. 4 illustrates a rear view of a closed coupler.

Figure 5:
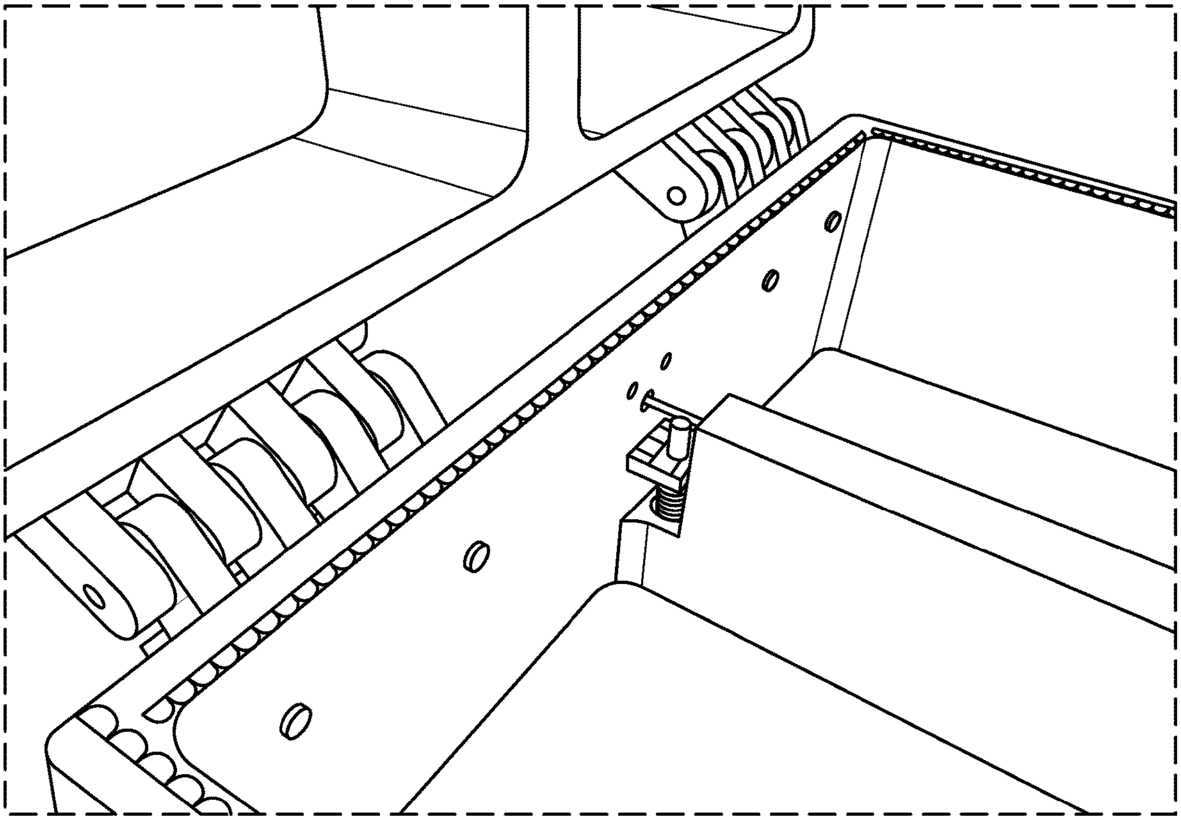
FIG. 5 illustrates the feed point and tuning mechanism of a coupler.

FIG. 5 illustrates the feed point and tuning mechanism of a coupler.

Figure 6:
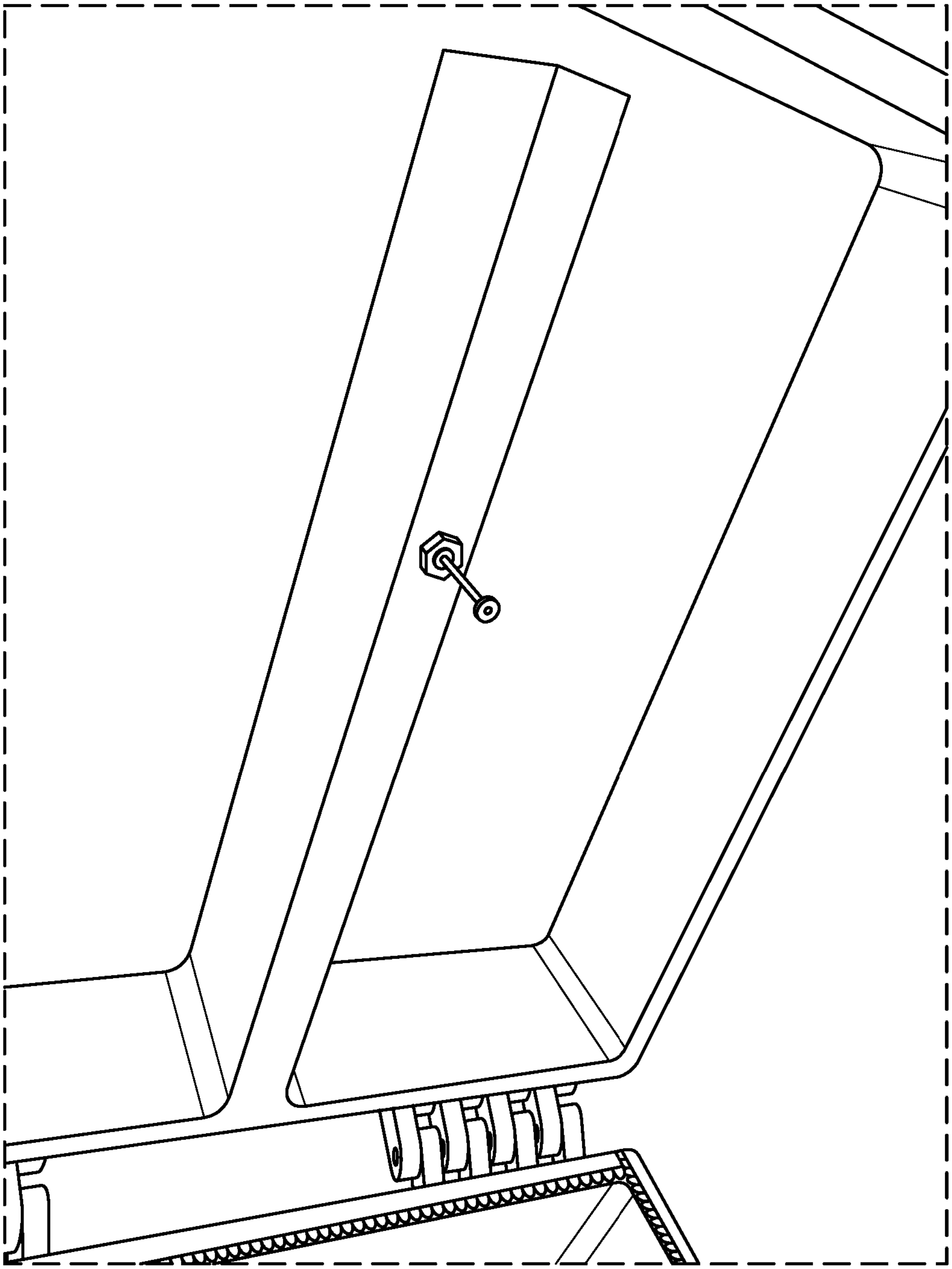
FIG. 6 illustrates a spring-loaded tip

FIG. 6 illustrates a spring-loaded tip

Figure 7A:
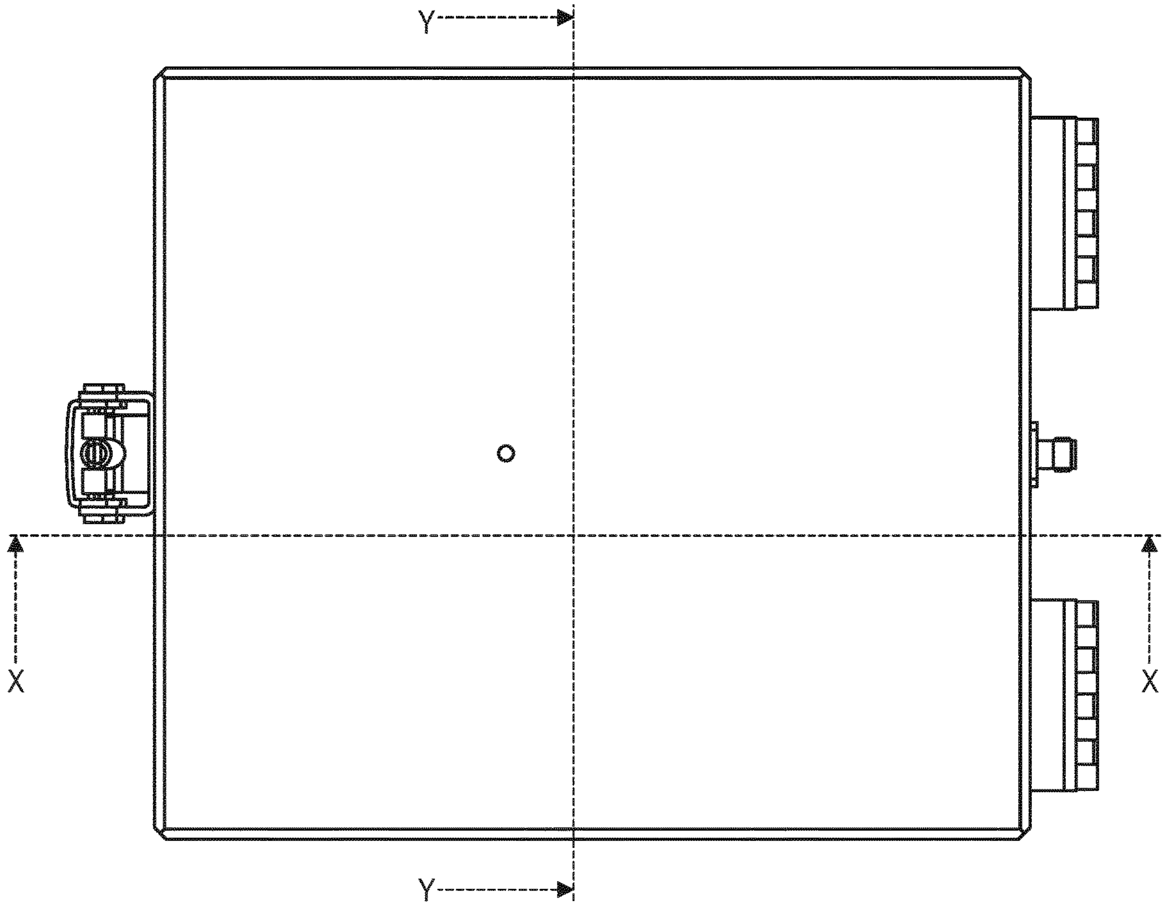
FIG. 7A illustrates a top view schematic drawing of a resonator according to a specific example.

FIG. 7A is a top view schematic drawing of a resonator according to a specific example.

Figure 7B:
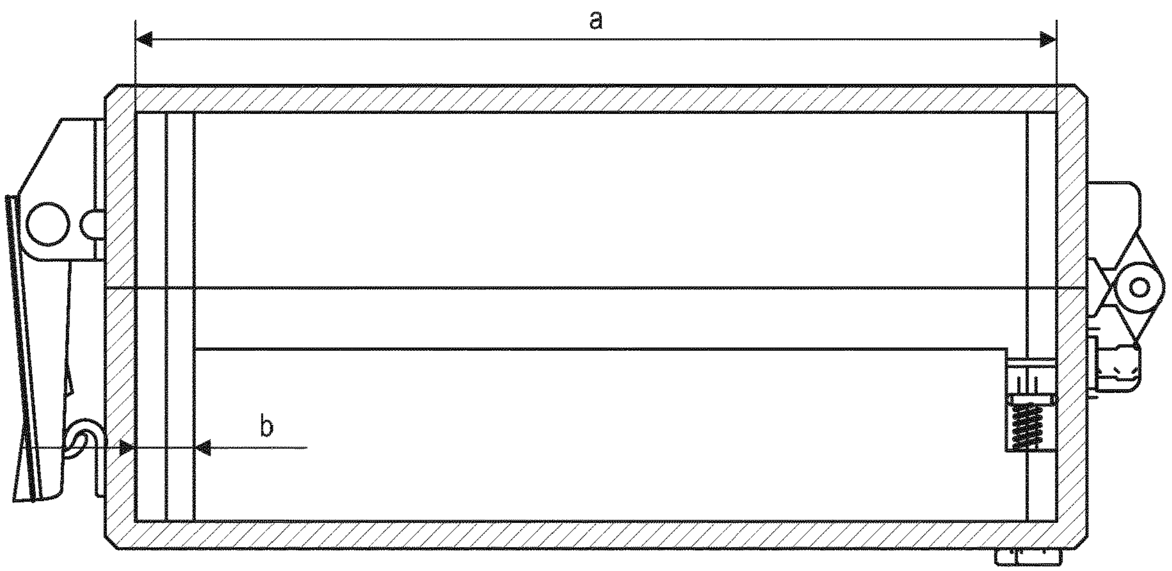
FIGS. 7B and 7C illustrate sectional views of the resonator illustrated in 7A.

FIG. 7B is a sectional view of the resonator illustrated in 7A, where the section is taken through the plane illustrated by line X-X in FIG. 7A.

An interior length of the waveguide is illustrated by dimension a. In some examples, the interior length a is 170 mm. In other examples, the interior length a is 170.00 mm.

A length of an insulating gap between the lower ridge and the distal end of the waveguide is illustrated by dimension b. In some examples, the length b of the insulating gap between the lower ridge and the distal end of the waveguide is 11 mm. In other examples, the length b of the insulating gap between the lower ridge and the distal end of the waveguide is 11.00 mm.

An insulating gap may also exist between the upper ridge and the distal end of the waveguide. The length of the insulating gap between the upper ridge and the distal end of the waveguide may be the same as the length b of the insulating gap between the lower ridge and the distal end of the waveguide. In some examples, the length of the insulating gap between the upper ridge and the distal end of the waveguide is 11 mm. In other examples, the length of the insulating gap between the upper ridge and the distal end of the waveguide is 11.00 mm.

Figure 7C:
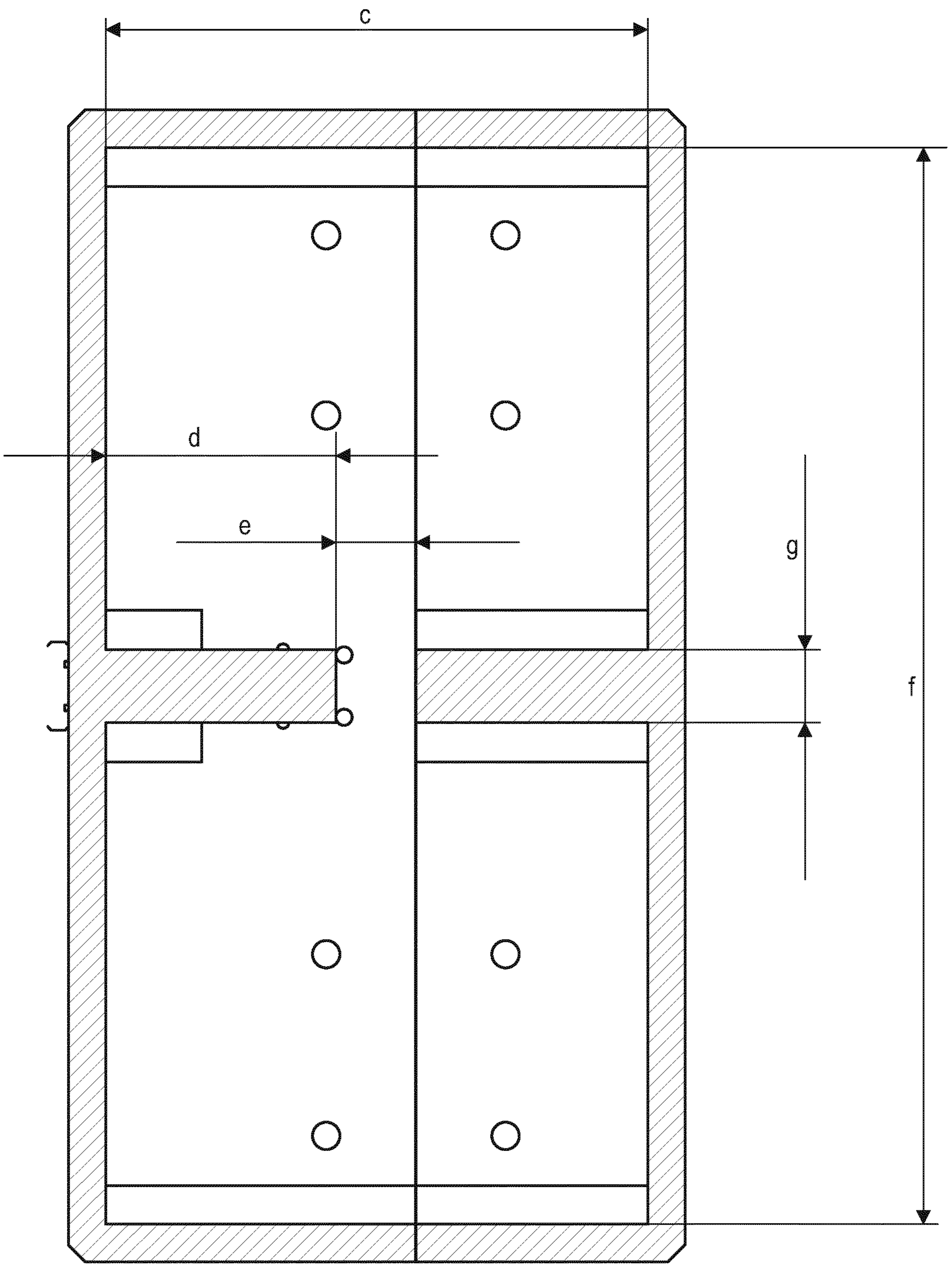

FIG. 7C is a sectional view of the resonator illustrated in 7A, where the section is taken through the plane illustrated by line Y-Y in FIG. 7A.

An interior depth of the waveguide of the waveguide is illustrated by dimension c. In some examples, the interior depth c of the waveguide is 75 mm. In other examples, the interior depth c of the waveguide is 75.08 mm.

A depth of the lower ridge is illustrated by dimension d. In some examples, the depth d of the lower ridge is 32 mm. In other examples, the depth d of the lower ridge is 32.00 mm.

A depth of the upper ridge may be the same as the depth d of the lower ridge. In some examples, the depth of the upper ridge is 11 mm. In other examples, the depth of the upper ridge is 11.00 mm.

A depth of an insulating gap between the lower ridge and the upper ridge is illustrated by dimension e. In some examples, the depth e of the insulating gap between the lower ridge and the upper ridge is 11 mm. In other examples, the depth e of the insulating gap between the lower ridge and the upper ridge is 11.08 mm.

An interior width of the waveguide of the waveguide is illustrated by dimension f. In some examples, the interior width f of the waveguide is 150 mm. In other examples, the interior width f of the waveguide is 150.00 mm.

A width of the lower ridge is illustrated by dimension g. In some examples, the width g of the lower ridge is 10 mm. In other examples, the width g of the lower ridge is 10.00 mm.

A width of the upper ridge may be the same as the width g of the lower ridge. In some examples, the width of the upper ridge is 10 mm. In other examples, the width of the upper ridge is 10.00 mm.

A thickness of a body of the resonator may be 5 mm. The external length, depth and width of the resonator may be 180 mm, 85 mm and 160 mm, respectively.

The frequency of operation of the resonator may be equal to the range that is supported by the tags and the reader chip. In some examples, this range is 860 MHz to 960 MHz. The dimensions of the resonator may be adjusted to operate in other frequency ranges.

Figure 8:
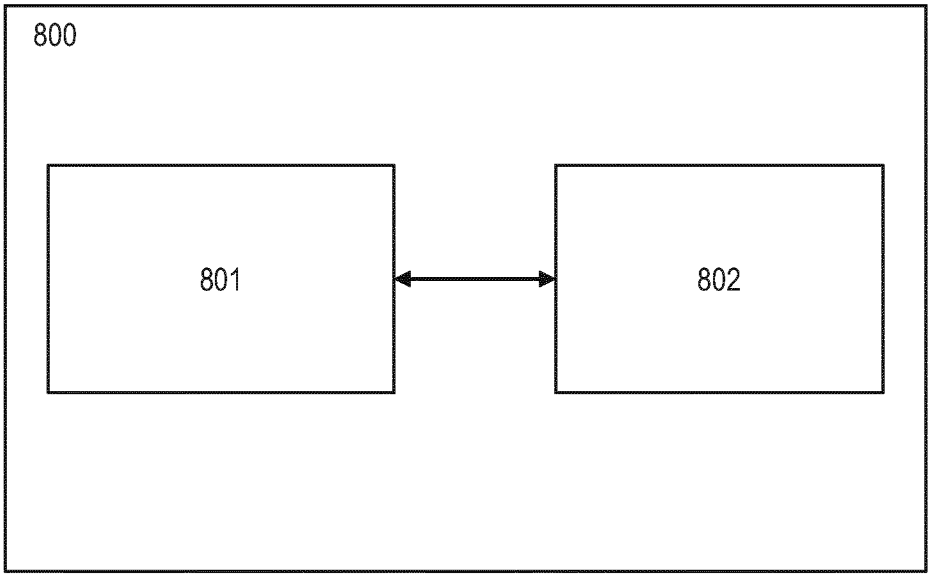
FIG. 8 illustrates a radio frequency identification reader

FIG. 8 illustrates a radio frequency identification reader 800. The reader comprises a resonator 801 electrically coupled to radio frequency identification reader circuitry 802.

Figure 9:
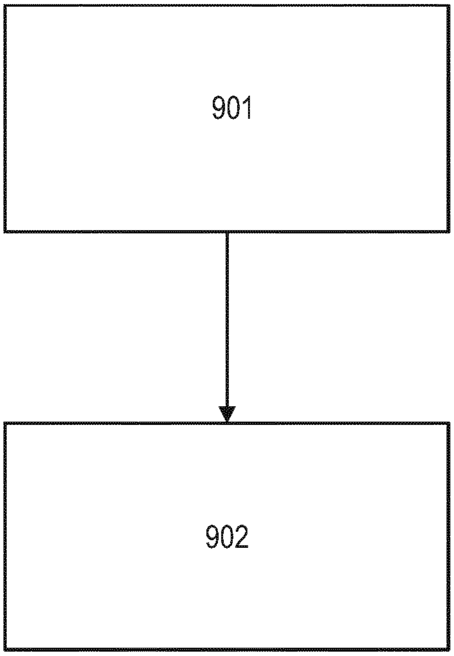
FIG. 9 illustrates a method of reading data from one or more radio frequency identification tags.

FIG. 9 illustrates a method of reading data from one or more radio frequency identification tags. The method comprises the following steps:

901: locating the one or more radio frequency identification tags in the holder of a resonator according to claim 1;

902: reading the data from the one or more radio frequency identification tags using radio frequency identification reader circuitry electrically coupled to the radio frequency feed point of the resonator.

As will be appreciated by the skilled person, details of the above examples may be varied, without departed from the intended scope of the invention. The scope of the invention is defined in the claims. For example, the tag reader may be incorporated into other devices. The CC-tag may take the form of different sizes and shapes. The CC-tag may be place within an item rather than on its surface. More than one CC-tag may be read at the same time. Many other combinations, modifications, or alterations to the features of the above embodiments will be readily apparent to the skilled person. Any of the features described specifically relating to one embodiment or example may be used in any other embodiment by making the appropriate changes.

The invention claimed is:

1. A resonator for a radio frequency identification reader, the resonator comprising:

a waveguide closed at a proximal end and closed at a distal end and dimensioned to facilitate resonance in radio frequency waves having a frequency of operation so that the radio frequency waves produce an electric field in the waveguide having a peak intensity at a location between the proximal end and the distal end, wherein the waveguide is a ridged waveguide comprising a pair of ridges extending from the proximal end of the waveguide towards the distal end of the waveguide, wherein the waveguide comprises a tuner comprising an adjustable conductive connection between the proximal end of the resonator and a first ridge of the pair of ridges, and wherein a central longitudinal axis of the waveguide is defined that extends from the proximal end of the waveguide to the distal end of the waveguide and is centrally located within the waveguide, wherein the adjustable conductive connection comprises a sliding contact wherein the conductive connection is adjustable by moving the sliding contact between a first location adjacent to a surface of the first ridge that faces a corresponding surface of a second ridge of the pair of ridges and a second position that is further from the second ridge;

a holder for holding one or more radio frequency identification tags at the location at which the electric field produced by radio frequency waves having the frequency of operation has a peak intensity; and a radio frequency feed point for coupling radio frequency signals between the waveguide and radio frequency identification reader circuitry.

2. The method of claim 1, wherein the resonator comprises an insulating gap between each ridge of the pair of ridges and the distal end of the waveguide.

3. The method of claim 2, wherein each insulating gap is an air gap.

4. The method of claim 3, wherein the resilient member comprises a biased conductive tip.

5. A radio frequency identification reader, the reader comprising:

a resonator comprising:

a waveguide closed at a proximal end and closed at a distal end and dimensioned to facilitate resonance in radio frequency waves having a frequency of operation so that the radio frequency waves produce an electric field in the waveguide having a peak intensity at a location between the proximal end and the distal end, wherein the waveguide is a ridged waveguide comprising a pair of ridges extending from the proximal end of the waveguide towards the distal end of the waveguide, wherein the waveguide comprises a tuner comprising an adjustable conductive connection between the proximal end of the resonator and a first ridge of the pair of ridges, and wherein a central longitudinal axis of the waveguide is defined that extends from the proximal end of the waveguide to the distal end of the waveguide and is centrally located within the waveguide, wherein the adjustable conductive connection comprises a sliding contact, wherein the conductive connection is adjustable by moving the sliding contact between a first location adjacent to a surface of the first ridge that faces a corresponding surface of a second ridge of the pair of ridges and a second position that is further from the second ridge, a holder for holding one or more radio frequency identification tags at the location at which the electric field produced by radio frequency waves having the frequency of operation has a peak intensity, and a radio frequency feed point for coupling radio frequency signals between the waveguide and radio frequency identification reader circuitry; and radio frequency identification reader circuitry electrically coupled to the radio frequency feed point of the resonator.

6. The resonator of claim 1, wherein the waveguide is formed from two portions that are mechanically coupled together so that the portions are in conductive communication at an interface between the two portions, wherein the portions are decoupleable to provide access to the holder, which is inside the waveguide.

7. A method of reading data from one or more radio frequency identification tags, the method comprising:

locating the one or more radio frequency identification tags in the holder of a resonator, wherein the resonator comprises:

a waveguide closed at a proximal end and closed at a distal end and dimensioned to facilitate resonance in radio frequency waves having a frequency of operation so that the radio frequency waves produce an electric field in the waveguide having a peak intensity at a location between the proximal end and the distal end, wherein the waveguide is a ridged waveguide comprising a pair of ridges extending from the proximal end of the waveguide towards the distal end of the waveguide, wherein the waveguide comprise a tuner comprising an adjustable conductive connection between the proximal end of the resonator and a first ridge of the pair of ridges, and wherein a central longitudinal axis of the waveguide is defined that extends from the proximal end of the waveguide to the distal end of the waveguide and is centrally located within the waveguide, wherein the adjustable conductive connection comprises a sliding contact, wherein the conductive connection is adjustable by moving the sliding contact between a first location adjacent to a surface of the first ridge that faces a corresponding surface of a second ridge of the pair of ridges and a second position that is further from the second ridge;

a holder for holding one or more radio frequency identification tags at the location at which the electric field produced by radio frequency waves having the frequency of operation has a peak intensity; and a radio frequency feed point for coupling radio frequency signals between the waveguide and radio frequency identification reader circuitry;

reading the data from the one or more radio frequency identification tags using radio frequency identification reader circuitry electrically coupled to the radio frequency feed point of the resonator.

8. The method of claim 7, wherein the holder comprises a resilient member configured to apply a force to the one or more radio frequency identification tags to urge the one or more radio frequency identification tags together.

9. The method of claim 7, wherein the waveguide comprises a tuner to adjust the impedance of the resonator.

10. The method of claim 7, wherein the tuner comprises a motor configured to move the sliding contact.

11. The method of claim 9, wherein the tuner comprises one or more pin diodes and/or varactors.

12. The method of claim 7, wherein the waveguide is formed from two portions that are mechanically coupled together so that the portions are in conductive communication at an interface between the two portions, wherein the portions are decoupleable to provide access to the holder, which is inside the waveguide.

13. The method of claim 12, wherein the two portions are mechanically coupled together by one or more latches and are decouplable by unfastening the one or more latches.

14. The method of claim 12, wherein the two portions of the waveguide are mechanically coupled by a hinge.

15. The method of claim 12, wherein the two portions of the waveguide comprise complementary alignment elements to position the two portions relative to each other.

16. The method of claim 7, wherein the one or more radio frequency identification tags comprise one or more banknotes, each having a respective tag affixed thereto.

* * * * *